US006762270B2

(12) United States Patent
Ludewig et al.

(10) Patent No.: US 6,762,270 B2
(45) Date of Patent: Jul. 13, 2004

(54) POLYURETHANE PREPOLYMERS WITH REDUCED FUNCTIONALITY HAVING TERMINAL ALKOXYSILANE AND OH GROUPS, A METHOD OF PREPARING THEM AND THEIR USE

(75) Inventors: Michael Ludewig, Köln (DE); Mathias Matner, Neuss (DE); Stefan Groth, Leverkusen (DE); Gerhard Ruttmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/357,002

(22) Filed: Feb. 3, 2003

(65) Prior Publication Data

US 2003/0153712 A1 Aug. 14, 2003

(30) Foreign Application Priority Data

Feb. 5, 2002  (DE) ......................................... 102 04 523

(51) Int. Cl.$^7$ ............................................. C08G 77/26
(52) U.S. Cl. ........................................................ 528/28
(58) Field of Search .......................................... 528/28

(56) References Cited

U.S. PATENT DOCUMENTS

| | | | |
|---|---|---|---|
| 4,474,933 A | * 10/1984 | Huber et al. ................. 528/26 |
| 4,857,623 A | 8/1989 | Emmerling et al. .......... 528/28 |
| 5,364,955 A | 11/1994 | Zwiener et al. ............. 556/418 |
| 5,554,709 A | 9/1996 | Emmerling et al. .......... 528/27 |
| 5,614,604 A | * 3/1997 | Krafcik ........................ 528/28 |
| 6,001,946 A | * 12/1999 | Waldman et al. ............. 528/28 |
| 6,288,198 B1 | * 9/2001 | Mechtel et al. ............... 528/28 |
| 6,498,210 B1 | * 12/2002 | Wang et al. ................. 524/588 |

FOREIGN PATENT DOCUMENTS

| | | |
|---|---|---|
| CA | 2325552 | 9/1999 |
| DE | 32 20 865 | 12/1983 |
| EP | 0 096 249 | 12/1983 |
| EP | 0 931 800 | 7/1999 |
| EP | 0 994 138 | 4/2000 |
| WO | 00/26271 | 5/2000 |

* cited by examiner

Primary Examiner—Margaret G. Moore
(74) Attorney, Agent, or Firm—Joseph C. Gil; Gary F. Matz

(57) ABSTRACT

The present invention relates to polyurethane prepolymer having terminal alkoxysilane and OH groups which is the reaction product of A) a polyurethane prepolymer prepared by incomplete reaction of
  i) an aromatic, aliphatic or cycloaliphatic diisocyanate component having an NCO content of 20 to 60% by weight with
  ii) a polyol component comprising a polyoxyalkylene diol having a number average molecular weight of 3000 to 20,000,
  wherein the reaction is stopped after 50 to 90% of the OH groups of component ii) are reacted and 10 to 50% are unreacted, with
B) a compound having alkoxysilane and amino groups, preferably a compound containing alkoxysilane and aspartate groups.

The present invention also relates to a process for preparing these polyurethane prepolymers containing terminal alkoxysilane and OH groups and to isocyanate-free, sealants, adhesives, primers and coatings containing these polyurethane prepolymers containing terminal alkoxysilane and OH groups as binders.

20 Claims, No Drawings

POLYURETHANE PREPOLYMERS WITH REDUCED FUNCTIONALITY HAVING TERMINAL ALKOXYSILANE AND OH GROUPS, A METHOD OF PREPARING THEM AND THEIR USE

FIELD OF THE INVENTION

The present invention relates to polyurethane prepolymers having terminal alkoxysilane and OH groups and prepared from high molecular weight polyurethane prepolymers with reduced functionality, a method of preparing them by premature termination of the synthesizing reaction and their use as binders for low-modulus sealants and adhesives.

BACKGROUND OF THE INVENTION

Alkoxysilane-functional polyurethanes which are cross-linked by silane polycondensation have been known for a long time. A summarizing article on this subject is contained e.g. in "Adhesives Age" April 1995, pp. 30 ff. (authors: Ta-Min Feng, B A Waldmann). Alkoxysilane-terminated, moisture-curing, one-component polyurethanes of this type are increasingly used as flexible coatings, sealants and adhesives in building and the automobile industry. In these applications the most important properties are elongation, adhesion and curing speed. However these properties required particularly in building cannot be fully achieved by these systems.

EP-A-596 360 describes alkoxysilyl-functional polyurethane prepolymers which are suitable for use as sealant binders. Due to the use of relatively short-chain polyethers made by KOH catalysis and having a high content of terminal double C=C bonds the products explicitly described in this application do not achieve the high molecular weight which is necessary for the preparation of soft and low-modulus sealants, such as those used in the construction industry.

An alkoxysilyl-functional polyurethane prepolymer which may be employed as a building sealant is described in WO 00/26271. A high molecular weight polypropylene oxide polyether prepared by two-metal cyanide catalysis is used, and guarantees relatively low viscosity in prepolymer synthesis when combined with secondary aminosilanes. Such compounds have a number average molecular weight (calculated from NCO and functionality) of over 15 000 g/mol and a range of properties that are suitable for use as building sealants. However, the viscosities of these systems are considerably high, which considerably restricts their range of applications.

DE-A 3629237 describes an alkoxysilyl-functional polyurethane system which achieves a better elongation by reducing functionality. This is done by subsequently lowering functionality either with monoalcohols or by employing monoisocyanates. However the properties required for a building sealant are not obtained in this way.

Polyurethane prepolymers with terminal alkoxysilyl groups and a long shelf life are known from WO 92/05212. Despite their relatively low number average molecular weights, they have relatively high viscosity. Also, an additional step in the reaction, using monoalcohols, is required to reduce their functionality. The use of high molecular weight polyethers in the preparation of sealant prepolymers is described in WO 99/48942. A reactive thinner project is disclosed, which also includes the use of low-functional constituents. The properties of the resulting cured polymer are said to be largely unaffected. However, this makes it necessary to synthesise a second polyurethane.

Prepolymers containing terminal alkoxysilane and OH groups are also known. A pressure-sensitive adhesive based on these compounds is described in DE-A 3 220 865. The specification describes the synthesis with adducts of diisocyanate and aminosilanes, though this has the drawback of two-stage synthesis. In addition, the diadduct of two molecules of aminosilane and diisocyanate will form and expensive aminosilane will thus be lost, leading to greater hardness which is undesirable in the sealants field.

An object of the present invention is to prepare polyurethane prepolymers having terminal alkoxysilane groups which overcome the described disadvantages of the prior art.

This object may be achieved with the high molecular weight polyurethane prepolymers having terminal alkoxysilane and OH groups of the present invention, which are described in detail below.

SUMMARY OF THE INVENTION

The present invention relates to polyurethane prepolymer having terminal alkoxysilane and OH groups which is the reaction product of A) a polyurethane prepolymer prepared by incomplete reaction, of
   i) an aromatic, aliphatic or cycloaliphatic diisocyanate component having an NCO content of 20 to 60% by weight with
   ii) a polyol component comprising a polyoxyalkylene diol having a number average molecular weight of 3000 to 20,000,
wherein the reaction is stopped after 50 to 90% of the OH groups of component ii) are reacted and 10 to 50% are unreacted, with B) a compound having alkoxysilane and amino groups, of formula (I)

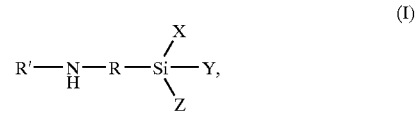

wherein

X, Y and Z are the same or different and represent linear or branched $C_1$–$C_8$ alkyl or $C_1$–$C_8$ alkoxy radicals, provided that at least one of the radicals represents a $C_1$–$C_8$ alkoxy group, R represents a linear or branched alkylene radical with 1 to 8 carbon atoms, R' represents hydrogen, a $C_1$–$C_8$ alkyl radical, a $C_6$–$C_{10}$ aryl radical or a radical of formula (II)

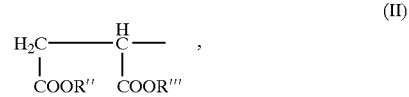

wherein

R" and R'" are the same or different and represent linear or branched alkyl radicals with 1 to 8 carbon atoms.

The present invention also relates to a process for preparing these polyurethane prepolymers containing terminal alkoxysilane and OH groups and to isocyanate-free, sealants, adhesives, primers and coatings containing these polyurethane prepolymers containing terminal alkoxysilane and OH groups as binders.

DETAILED DESCRIPTION OF THE INVENTION

In formula (I) X, Y and Z preferably represent methoxy and/or ethoxy groups and R' preferably represents a radical of formula (II).

The lowering of the functionality of the prepolymers according to the invention leads to a low-modulus polymer. Prepolymers with a relatively low mean molecular weight and low viscosity can thereby be used to achieve excellent properties. The prepolymer according to the invention obtains this range of properties through incomplete conversion of the OH groups of the polyethers used with a diisocyanate and subsequent termination of the terminal NCO groups with aminosilanes. The remaining OH groups have been found, surprisingly, not to shorten the shelf life and not to be involved in the polymerisation process even during curing.

Polyurethane prepolymer A) is prepared by reacting an excess of diisocyanate component i) with polyol component ii) such that 50 to 90% of the OH groups of polyol component ii) are reacted with the NCO groups of diisocyanate component i) and 10 to 50% of the OH groups of polyol component ii) are not reacted in polyurethane prepolymer A). The resulting prepolymer A) contains both isocyanate groups and OH groups.

Isocyanates which may be used as polyisocyanate component i) include aliphatic, cycloaliphatic or aromatic diisocyanates having an isocyanate content of 20 to 60% by weight. The term "aromatic" or "cycloaliphatic" diisocyanates refers to those with at least one aromatic or cycloaliphatic ring per molecule in which at least one of the two isocyanate groups is preferably, but not necessarily, directly linked to an aromatic or cycloaliphatic ring. Examples of aromatic and cycloaliphatic diisocyanates are those having a molecular weight of 174 to 300, such as 4,4'-diphenylmethane diisocyanate or mixtures thereof with 2,4'-diphenylmethane diisocyanate, 2,4-diisocyanatotoluene and mixtures thereof with preferably up to 35% by weight, based on the weight of the mixture with 2,6-diisocyanatotoluene, 1-isocyanato-3,3,5-trimethyl-5-isocyanatomethylcyclohexane (IPDI), bis-(4-isocyanatocyclohexyl)-methane, 1-isocyanato-1-methyl-4 (3)-isocyanatomethyl-cyclohexane and 1,3-diisocyanato-6-methyl-cyclohexane, optionally in admixture with 1,3-diisocyanato-2-methylcycloyhexane. Mixtures of these isocyanates may also be used.

1-isocyanato-3,3,5-trimethyl-5-isocyanatomethylcyclohexane (IPDI) is particularly preferred as component i).

Polyol component ii) contains as its major component (>50 by weight) a polyoxyalkylene diol having a number average molecular weight of 3000 to 20 000 (corresponding to an OH number of 37.3 to 5.6), preferably 4000 to 15 000 (corresponding to an OH number of 28 to 7.5). Preferably, the polyoxyalkylene diols have a maximum ethylene oxide content of 20% by weight, based on the total weight of polyoxyalkylene diol. The polyoxyalkylene diols are prepared in known manner by the ethoxylation and/or propoxylation of suitable starter molecules. Examples include diols such as ethylene glycol, propylene glycol, 1,3-butane diol, 1,4-butane diol, 1,6-hexane diol, 2-ethylhexane diol-1,3 and primary monoamines, such as aliphatic amines, e.g., ethylamine and butylamine.

Polypropylene oxide polyethers with a maximum terminal unsaturation of 0.04 meq/g and a number average molecular weight, calculated from the OH content and functionality, of 8000 to 12 000 are especially preferred as component ii). Polyether polyols with a low degree of unsaturation are described, for example, in EP-A 283 148 and U.S. Pat. No. 3,278,457.

In the preparation of NCO prepolymers A) minor amounts of low molecular weight di- and trihydric alcohols with a molecular weight of 32 to 500 may optionally be used with the other materials. Examples include ethylene glycol, propylene glycol, 1,3-butane diol, 1,4-butane diol, 1,6-hexane diol, glycerine and trimethylene propane. However, the use of low molecular weight alcohols is less preferred.

In the preparation of NCO prepolymers A) minor amounts of known trifunctional and higher functional polyether polyols may also be used, although this is less preferred.

Polyurethane prepolymers A) are prepared by reacting diisocyanate component i) with diol component ii) at a temperature of 40 to 120° C., preferably 50 to 100° C., and an NCO/OH equivalent ratio of 1.2:1 to 2.0:1, preferably 1.3:1 to 1.8:1. The reaction is stopped when 50–90%, preferably 70 to 85%, of the OH groups in the polyol component have been reacted, i.e. while 10 to 50%, preferably 30 to 15%, of the OH groups have not reacted with NCO groups.

Conversion may be determined by the known NCO titration process from polyurethane chemistry. The reaction is stopped by adding a small amount of an inorganic or organic acid, such as hydrochloric, sulphuric, phosphoric acid or derivatives thereof, formic acid, acetic acid, another alkane acid or organic acid or an acid-releasing component such as acid halides. Examples include formic acid chloride, acetic acid chloride, propionic acid chloride and benzoyl chloride. Benzoyl chloride is preferred. Optionally, the stopper may be dispensed with and the aminosilane compound may be added directly. In this embodiment the aminosilane compound is added immediately to reduce any further isocyanate-OH reaction in favor of the isocyanate-NH reaction.

Known amine-type or organo-metallic catalysts may optionally be used with the other materials to prepare the polyurethane prepolymers. In a preferred embodiment dibutyl tin dilaurate is used as a catalyst in admixture with isophorone diisocyanate.

Polyurethane prepolymers A) have an NCO content of 0.1 to 2.6%, preferably 0.3 to 2.0%, which corresponds to a number average molecular weight of 3000 to 42 000, preferably 4000 to 20 000 according to the ratio of NCO to OH groups.

At the second stage of the method of the invention the polyurethane prepolymers A) which may be used according to the invention are reacted with compounds of formula (I)

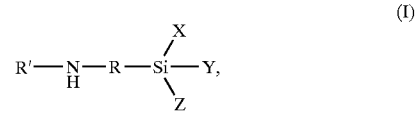

(I)

wherein

X,Y and Z are the same or different and represent linear or branched $C_{1-8}$ alkyl or $C_1$–$C_8$ alkoxy radicals, provided that at least one of the radicals represents a $C_1$–$C_8$ alkoxy group, R represents a linear or branched alkylene radical with 1 to 8 carbon atoms, preferably 1 to 4 carbon atoms, R' represents hydrogen, a linear or branched alkyl radical, an aryl radical or a radical of formula (II)

(II)

wherein
R″ and R‴ are the same or different and represent linear or branched alkyl radicals with 1 to 8 carbon atoms, preferably 1 to 4 carbon atoms. It is preferred to use a compound of formula (I) with alkoxy silane and amino groups, in which the radical R' corresponds to formula (II). A compound of this type is prepared as described in EP-A 596 360.

The reaction between the NCO prepolymers and the formula (I) compounds containing alkoxysilane and amino groups takes place at a temperature of 0 to 150° C., preferably 20–80° C., and the amounts are preferably chosen so that 0.95 to 1.1 moles of aminosilane compound is introduced per mole of NCO groups. It is more preferred to use 1 mole of aminosilane compound per mole of NCO groups. According to the teachings of EP-A 807 649 a cyclocondensation reaction may take place if higher reaction temperatures are used, but this does affect the resulting products and may even be advantageous.

The polyurethane prepolymers containing terminal alkoxysilane and OH groups according to the invention may be used as binders for isocyanate-free, low-modulus polyurethane sealants, preferably for the construction industry. These sealants are cross-linked by the action of air humidity through the polycondensation of silanol. The polyurethane prepolymers are also suitable as binders for adhesives, primers and coatings.

To prepare sealants the polyurethane prepolymers with terminal alkoxysilane groups invention may be formulated with known additives such as plasticizers, fillers, pigments, drying agents, additives, light stabilizers, anti-oxidants, thixotropy-imparting agents, catalysts and coupling agents. Examples of suitable fillers include carbon black, precipitated silicic acids, pyrogenic silicic acids, mineral chalks and precipitated chalks. Examples of suitable plasticizers include phthalates, adipates, alkyl sulphonates of phenol and phosphates. Examples of thixotropy-imparting agents include pyrogenic silicic acids, polyamides, hydrated secondary products of castor oil and polyvinyl chloride.

Examples of suitable curing catalysts include organo-tin compounds and amine catalysts. Examples of organo-tin compounds include dibutyl tin diacetate, dibutyl tin dilaurate, dibutyl tin bis-acetoacetonate and tin carboxylates such as tin octoate. The tin catalysts may optionally be used combined with amine catalysts such as aminosilanes or diazabicyclooctane. Suitable drying agents include alkoxysilyl compounds such as vinyl trimethoxysilane, methyl trimethoxysilane, i-butyl trimethoxysilane and hexadecyl trimethoxysilane.

Suitable coupling agents include the known functional silanes such as aminosilanes of the above-mentioned type and also N-aminoethyl-3-aminopropyl-trimethoxy, N-aminoethyl-3-aminopropyl-methyl-dimethoxysilane, epoxy silanes and/or mercaptosilanes.

The cross-linked polymers have excellent elongation and a low modulus. If the NCO/OH ratio drops with a constant molecular weight of the polymer a reduction in modulus and Shore hardness and an increase in elongation at break are observed. The increase in surface tack is only slight within the preferred range of the invention.

The invention is further illustrated but is not intended to be limited by the following examples in which all parts and percentages are by weight unless otherwise specified.

EXAMPLES

Example 1

1004 g of a polypropylene glycol having an OH number of 10.6 (Acclaim® 12200, Bayer AG, Leverkusen) were dried under vacuum (with a small amount of nitrogen flowing through) at 120° C. for six hours. It was then reacted with 38.0 g of isophorone diisocyanate (Bayer AG, Leverkusen) (NCO/OH equivalent ratio–1.8) at 60° C. in the presence of 45 ppm of dibutyl tin dilaurate (Desmorapid Z®, Bayer AG, Leverkusen) until an NCO content of 0.76% (=80% conversion) was reached. The reaction was stopped by adding 50 ppm of benzoyl chloride (Fluka Chemie GmbH, Buchs, Switzerland). 65.5 g of N-(3-trimethoxysilylpropyl) aspartic acid diethylester (prepared according to EP-A 596 360, Example 5) were then dripped in quickly at 60° C. and stirred until an isocyanate band was no longer seen in the IR spectrum. The resulting polyurethane prepolymer with terminal alkoxysilyl and OH groups had a viscosity of 41,100 mPa.s (23° C.).

A film was poured onto a glass plate, catalyzed by Dynasilan® DAMO (Degussa AG, Frankfurt a. M.) (1.11%), dibutyl tin diacetate (Goldschmidt AG, Essen) (0.11%) and 1,4-diazabicyclo[2.2.2]octane (DABCO, Merck KGaA, Darmstadt) (0.19%) and cured overnight to give a clear, highly elastic plastic having a Shore A hardness of 24.

Comparison to Example 1

1004 g of a polypropylene glycol having an OH number of 10.6 (Acclaim® 12200, Bayer AG, Leverkusen) were dried under vacuum (with a small amount of nitrogen flowing through) at 120° C. for six hours. It was then reacted with 38.0 g of isophorone diisocyanate (Bayer AG, Leverkusen) (NCO/OH equivalent ratio–1.8) at 60° C. in the presence of 45 ppm of dibutyl tin dilaurate (Desmorapid Z®, Bayer AG, Leverkusen) until the theoretical NCO content of 0.61% (=100% conversion) was reached. The reaction was stopped by adding 50 ppm of benzoyl chloride (Fluka Chemie GmbH, Buchs, Switzerland). 53.0 g of N-(3-trimethoxysilylpropyl)aspartic acid diethylester (prepared according to EP-A 596 360, Example 5) were then dripped in quickly at 60° C. and stirred until an isocyanate band was no longer seen in the IR spectrum. The resulting polyurethane prepolymer with terminal alkoxysilyl groups had a viscosity of 108,500 mPa.s (23° C.).

A film was poured onto a glass plate, catalyzed by Dynasilan® DAMO (Degussa AG, Frankfurt a. M.) (1.11%), dibutyl tin diacetate (Goldschmidt AG, Essen) (0.11%) and 1,4-diazabicyclo[2.2.2]octane (DABCO, Merck KGaA, Darmstadt) (0.19%) and cured overnight to give a clear, highly elastic plastic having a Shore A hardness of 39.

Example 2

1004 g of a polypropylene glycol having an OH number of 10.6 (Acclaim® 12200, Bayer AG, Leverkusen) were dried under vacuum (with a small amount of nitrogen flowing through) at 120° C. for six hours. It was then reacted with 35.5 g of isophorone diisocyanate (Bayer AG, Leverkusen) (NCO/OH equivalent ratio–1.6) at 60° C. in the presence of 45 ppm of dibutyl tin dilaurate (Desmorapid Z®, Bayer AG, Leverkusen) until an NCO content of 0.69% (=70% conversion) was reached. The reaction was stopped by adding 50 ppm of benzoyl chloride (Fluka Chemie GmbH, Buchs, Switzerland). 63.2 g of N-(3- trimethoxysilylpropyl)aspartic acid diethylester (prepared according to EP-A 596 360, Example 5) were then dripped in quickly at 60° C. and stirred until an isocyanate band was no longer seen in the IR spectrum. The resulting polyurethane prepolymer with terminal alkoxysilyl and OH groups had a viscosity of 37,700 mPa.s (23° C.).

A film was poured onto a glass plate, catalysed by Dynasilan® DAMO (Degussa AG, Frankfurt a. M.) (1.11%), dibutyl tin diacetate (Goldschmidt AG, Essen) (0.11%) and 1,4-diazabicyclo[2.2.2]octane (DABCO, Merck KGaA, Darmstadt) (0.19%) and cured overnight to give a clear, highly elastic plastic having a Shore A hardness of 17.

Example 3

1004 g of a polypropylene glycol having an OH number of 10.6 (Acclaim® 12200, Bayer AG, Leverkusen) were dried under vacuum (with a small amount of nitrogen flowing through) at 120° C. for six hours. It was then reacted with 35.5 g of isophorone diisocyanate (Bayer AG, Leverkusen) (NCO/OH equivalent ratio—1.6) at 60° C. in the presence of 45 ppm of dibutyl tin dilaurate (Desmorapid Z®, Bayer AG, Leverkusen) until an NCO content of 0.61% (=80% conversion) was reached. The reaction was stopped by adding 50 ppm of benzoyl chloride (Fluka Chemie GmbH, Buchs, Switzerland). 56.2 g of N-(3-trimethoxysilylpropyl)aspartic acid diethylester (prepared according to EP-A 596 360, Example 5) were then dripped in quickly at 60° C. and stirred until an isocyanate band was no longer seen in the IR spectrum. The resulting polyurethane prepolymer with terminal alkoxysilyl and OH groups had a viscosity of 73,400 mPa.s (23° C.).

A film was poured onto a glass plate, catalysed by Dynasilan® DAMO (Degussa AG, Frankfurt a. M.) (1.11%), dibutyl tin diacetate (Goldschmidt AG, Essen) (0.11%) and 1,4-diazabicyclo[2.2.2]octane (DABCO, Merck KGaA, Darmstadt) (0.19%) and cured overnight to give a clear, highly elastic plastic having a Shore A hardness of 26.

Comparison to Examples 2 and 3

1004 g of a polypropylene glycol having an OH number of 10.6 (Acclaim® 12200, Bayer AG, Leverkusen) were dried under vacuum (with a small amount of nitrogen flowing through) at 120° C. for six hours. It was then reacted with 35.5 g of isophorone diisocyanate (Bayer AG, Leverkusen) (NCO/OH equivalent ratio—1.6) at 60° C. in the presence of 90 ppm of dibutyl tin dilaurate (Desmorapid Z®, Bayer AG, Leverkusen) until the theoretical NCO content of 0.46% (=100% conversion) was reached. The reaction was stopped by adding 50 ppm of benzoyl chloride (Fluka Chemie GmbH, Buchs, Switzerland). 42.2 g of N-(3-trimethoxysilylpropyl)aspartic acid diethylester (prepared according to EP-A 596 360, Example 5) were then dripped in quickly at 60° C. and stirred until an isocyanate band was no longer seen in the IR spectrum. The resulting polyurethane prepolymer with terminal alkoxysilyl groups had a viscosity of 166,000 mPa.s (23° C.).

A film was poured onto a glass plate, catalysed by Dynasilan® DAMO (Degussa AG, Frankfurt a. M.) (1.11%), dibutyl tin diacetate (Goldschmidt AG, Essen) (0.11%) and 1,4-diazabicyclo[2.2.2]octane (DABCO, Merck KGaA, Darmstadt) (0.19%) and cured overnight to give a clear, highly elastic plastic with a Shore A hardness of 37.

Example 4

Preparation of an Isocyanate-Free Polyurethane Sealant.

The following constituents were processed into a ready-to-use sealant in a commercial planetary mixer:

150 g prepolymer from Example 2

90 g diisodecylphthalate (plasticizer, Jayflex® DIDP, Exxon Mobile Chemical Corp., Houston, USA)

9 g vinyl trimethoxysilane (Dynasilan® VTMO, Degussa AG, Frankfurt a.M.)

225 g precipitated chalk (type: Socal U1S2®, Solvay Deutschland GmbH, Hannover)

The mixture was dispersed for 15 minutes at a pressure of 100 mbar, with the internal temperature rising to 60° C. Then 4.5 g Dynasilan® DAMO (Degussa AG, Frankfurt a.M.) were added with simultaneous cooling and processed at a pressure of 100 mbar by agitating for 5 minutes.

4.5 g Tegokat 233® (10% in DIDP) (Goldschmidt AG, Essen) were admixed and agitated for 10 minutes at 100 mbar.

The resulting sealant had the following properties:

| | |
|---|---|
| Skinning (25° C./45% relative humidity) | 45 min |
| Shore A | 37 |
| Tensile strength | 2.8 N/mm2 |
| 100% modulus | 1.1 N/mm2 |
| Elongation at break | 336% |
| Tear propagation resistance | 13.1 N/mm |

The sealant had little surface tack and a long shelf life.

Example 5

Preparation of an Isocyanate-Free Polyurethane Sealant

The following constituents were processed into a ready-to-use sealant in a commercial planetary mixer:

150 g prepolymer from Example 3

90 g diisodecylphthalate (plasticizer, Jayflex® DIDP, Exxon Mobile Chemical Corp., Houston, USA)

9 g vinyl trimethoxysilane (Dynasilan® VTMO, Degussa AG, Frankfurt a.M.)

225 g precipitated chalk (type: Socal U1S2®, Solvay Deutschland GmbH, Hannover)

The mixture was dispersed for 15 minutes at a pressure of 100 mbar, with the internal temperature rising to 60° C. Then 4.5 g Dynasilan® DAMO (Degussa AG, Frankfurt a.M.) were added with simultaneous cooling and processed at a pressure of 100 mbar by agitating for 5 minutes.

4.5 g Tegokat 233® (10% in DIDP) (Goldschmidt AG, Essen) were admixed and agitated for 10 minutes at 100 mbar.

The resulting sealant had the following properties:

| | |
|---|---|
| Skinning (25° C./45% relative humidity) | 35 min |
| Shore A | 45 |
| Tensile strength | 3.3 N/mm2 |
| 100% modulus | 1.4 N/mm2 |
| Elongation at break | 343% |
| Tear propagation resistance | 12.2 N/mm |

The sealant had little surface tack and a long shelf life.

Comparison to Examples 4 and 5

Preparation of an Isocyanate-Free Polyurethane Sealant.

The following constituents were processed into a ready-to-use sealant in a commercial planetary mixer:

150 g prepolymer from the comparison to Examples 2 and 3

90 g diisodecylphthalate (plasticizer, Jayflex® DIDP, Exxon Mobile Chemical Corp., Houston, USA)

9 g vinyl trimethoxysilane (Dynasilan® VTMO, Degussa AG, Frankfurt a.M.)

225 g precipitated chalk (type: Socal U1S2®, Solvay Deutschland GmbH, Hannover)

The mixture was dispersed for 15 minutes at a pressure of 100 mbar, with the internal temperature rising to 60° C. Then 4.5 g Dynasilan® DAMO (Degussa AG, Frankfurt a.M.) were added with simultaneous cooling and processed at a pressure of 100 mbar by agitating for 5 minutes.

4.5 g Tegokat 233® (10% in DIDP) (Goldschmidt AG, Essen) were admixed and agitated for 10 minutes at 100 mbar.

The resulting sealant had the following properties:

| Skinning (25° C./45% relative humidity) | 15 min |
|---|---|
| Shore A | 52 |
| Tensile strength | 3.7 N/mm2 |
| 100% modulus | 1.7 N/mm2 |
| Elongation at break | 363% |
| Tear propagation resistance | 9.0 N/mm |

The sealant had little surface tack and a long shelf life.

Although the invention has been described in detail in the foregoing for the purpose of illustration, it was to be understood that such detail was solely for that purpose and that variations can be made therein by those skilled in the art without departing from the spirit and scope of the invention except as it may be limited by the claims.

What is claimed is:

1. A polyurethane prepolymer having terminal alkoxysilane and OH groups which is the reaction product of
   A) a polyurethane prepolymer which is the reaction product of an excess, based on the isocyanate groups of i) and the hydroxyl groups of ii), of
      i) an aromatic, aliphatic or cycloaliphatic diisocyanate component having an NCO content of 20 to 60% by weight with
      ii) a polyol component comprising a polyoxyalkylene dial having a number average molecular weight of 3000 to 20,000,
   wherein 50 to 90% of the OH groups of component ii) are reacted and 10 to 50% are unreacted, with
   B) a compound having alkoxysilane and amino groups, of formula (I)

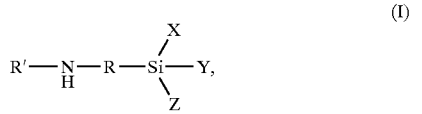

wherein
X, Y and Z are the same or different and represent linear or branched $C_1$–$C_8$ alkyl or $C_1$–$C_8$ alkoxy radicals, provided that at least one of the radicals represents a $C_1$–$C_8$ alkoxy group,
R represents a linear or branched alkylene radical with 1 to 8 carbon atoms,
R' represents hydrogen, a $C_1$–$C_8$ alkyl radical, a $C_6$–$C_{10}$ aryl radical or a radical of formula (II)

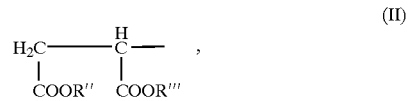

wherein
R" and R'" are the same or different and represent linear or branched alkyl radicals with 1 to 8 carbon atoms.

2. The polyurethane prepolymer having terminal alkoxysilane and OH groups of claim 1 wherein 70 to 85% of the OH groups of component ii) are reacted and 15 to 30% are unreacted.

3. The polyurethane prepolymer having terminal alkoxysilane and OH groups of claim 1 wherein said polyoxyalkylene diol comprises a polyoxypropylene diol having a maximum terminal unsaturation of 0.4 meq/g.

4. The polyurethane prepolymer having terminal alkoxysilane and OH groups of claim 2 wherein said polyoxyalkylene diol comprises a polyoxypropylene diol having a maximum terminal unsaturation of 0.4 meq/g.

5. The polyurethane prepolymer having terminal alkoxysilane and OH groups of claim 1 wherein X, Y and Z are the same or different and represent methoxy or ethoxy.

6. The polyurethane prepolymer having terminal alkoxysilane and OH groups of claim 2 wherein X, Y and Z are the same or different and represent methoxy or ethoxy.

7. The polyurethane prepolymer having terminal alkoxysilane and OH groups of claim 3 wherein X, Y and Z are the same or different and represent methoxy or ethoxy.

8. The polyurethane prepolymer having terminal alkoxysilane and OH groups of claim 4 wherein X, Y and Z are the same or different and represent methoxy or ethoxy.

9. The polyurethane prepolymer having terminal alkoxysilane and OH groups of claim 1 wherein R' represents a radical of formula (II).

10. The polyurethane prepolymer having terminal alkoxysilane and OH groups of claim 2 wherein R' represents a radical of formula (II).

11. The polyurethane prepolymer having terminal alkoxysilane and OH groups of claim 3 wherein R' represents a radical of formula (II).

12. The polyurethane prepolymer having terminal alkoxysilane and OH groups of claim 4 wherein R' represents a radical of formula (II).

13. The polyurethane prepolymer having terminal alkoxysilane and OH groups of claim 5 wherein R' represents a radical of formula (II).

14. The polyurethane prepolymer having terminal alkoxysilane and OH groups of claim 6 wherein R' represents a radical of formula (II).

15. The polyurethane prepolymer having terminal alkoxysilane and OH groups of claim 7 wherein R' represents a radical of formula (II).

16. The polyurethane prepolymer having terminal alkoxysilane and OH groups of claim 8 wherein R' represents a radical of formula (II).

17. A process for preparing a polyurethane prepolymer having terminal alkoxysilane and OH groups which comprises reacting
   A) a polyurethane prepolymer which is the reaction product of an excess, based on the isocyanate groups of i) and the hydroxyl groups of ii), of
      i) an aromatic, aliphatic or cycloaliphatic diisocyanate component having an NCO content of 20 to 60% by weight with
      ii) a polyol component comprising a polyoxyalkylene diol having a number average molecular weight of 3000 to 20,000, wherein 50 to 90% of the OH groups of component ii) are reacted and 10 to 50% are unreacted, with B) a compound having alkoxysilane and amino groups, of formula (I)

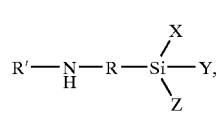

(I)

wherein

X, Y and Z are the same or different and represent linear or branched $C_1$–$C_8$ alkyl or $C_1$–$C_8$ alkoxy radicals, provided that at least one of the radicals represents a $C_1$–$C_8$ alkoxy group, R represents a linear or branched alkylene radical with 1 to 8 carbon atoms, R' represents hydrogen, a $C_1$–$C_8$ alkyl radical, a $C_6$–$C_{10}$ aryl radical or a radical of formula (II)

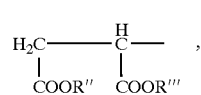

(II)

wherein

R" and R'" are the same or different and represent linear or branched alkyl radicals with 1 to 8 carbon atoms.

18. A sealant, adhesive, primer or coating containing a polyurethane prepolymer containing terminal alkoxysilane and OH groups, as the binder, which comprises the reaction product of A) a polyurethane prepolymer which is the reaction product of an excess, based on the isocyanate groups of i) and the hydroxyl groups of ii), of
  i) an aromatic, aliphatic or cycloaliphatic diisocyanate component having an NCO content of 20 to 60% by weight with
  ii) a polyol component comprising a polyoxyalkylene diol having a number average molecular weight of 3000 to 20,000, wherein 50 to 90% of the OH groups of component ii) are reacted and 10 to 50% are unreacted, with B) a compound having alkoxysilane and amino groups, of formula (I)

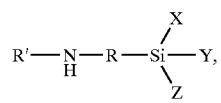

(I)

wherein

X, Y and Z are the same or different and represent linear or branched $C_1$–$C_8$ alkyl or $C_1$–$C_8$ alkoxy radicals, provided that at least one of the radicals represents a $C_1$–$C_8$ alkoxy group, R represents a linear or branched alkylene radical with 1 to 8 carbon atoms, R' represents hydrogen, a $C_1$–$C_8$ alkyl radical, a $C_6$–$C_{10}$ aryl radical or a radical of formula (II)

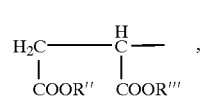

(II)

wherein

R" and R'" are the same or different and represent linear or branched alkyl radicals with 1 to 8 carbon atoms.

19. The sealant, adhesive, primer or coating according to claim 18, wherein 70 to 85% of the OH groups of component ii) of the polyurethane prepolymer having terminal alkoxysilane and OH groups are reacted and 15 to 30% are unreacted.

20. The sealant, adhesive, primer or coating according to claim 18, wherein X, Y and Z in the polyurethane prepolymer having terminal alkoxysilane and OH groups are the same or different and represent methoxy or ethoxy.

* * * * *

UNITED STATES PATENT AND TRADEMARK OFFICE
CERTIFICATE OF CORRECTION

PATENT NO. : 6,762,270 B2
DATED : July 13, 2004
INVENTOR(S) : Michael Ludewig et al.

It is certified that error appears in the above-identified patent and that said Letters Patent is hereby corrected as shown below:

Column 9,
Line 45, delete "dial" and insert -- diol --.

Column 11,
Line 19, delete "a $C_{1-C8}$alkyl radical," and insert -- a $c_1$-$c_8$ alkyl radical, --.

Signed and Sealed this

Nineteenth Day of April, 2005

JON W. DUDAS
*Director of the United States Patent and Trademark Office*